(12) United States Patent
Yu et al.

(10) Patent No.: US 9,554,141 B2
(45) Date of Patent: Jan. 24, 2017

(54) INTRA BLOCK COPY FOR INTRA SLICES IN HIGH EFFICIENCY VIDEO CODING (HEVC)

(71) Applicant: ARRIS Enterprises, Inc., Suwanee, GA (US)

(72) Inventors: Yue Yu, San Diego, CA (US); Limin Wang, San Diego, CA (US)

(73) Assignee: ARRIS Enterprises, Inc., Suwanee, GA (US)

(*) Notice: Subject to any disclaimer, the term of this patent is extended or adjusted under 35 U.S.C. 154(b) by 25 days.

(21) Appl. No.: 14/546,315

(22) Filed: Nov. 18, 2014

(65) Prior Publication Data

US 2015/0139296 A1    May 21, 2015

Related U.S. Application Data

(60) Provisional application No. 61/905,822, filed on Nov. 18, 2013.

(51) Int. Cl.
| | |
|---|---|
| H04B 1/66 | (2006.01) |
| H04N 19/174 | (2014.01) |
| H04N 19/70 | (2014.01) |
| H04N 19/46 | (2014.01) |
| H04N 19/593 | (2014.01) |
| H04N 19/11 | (2014.01) |
| H04N 19/157 | (2014.01) |
| H04N 19/103 | (2014.01) |
| H04N 19/159 | (2014.01) |

(52) U.S. Cl.
CPC ......... *H04N 19/174* (2014.11); *H04N 19/103* (2014.11); *H04N 19/11* (2014.11); *H04N 19/157* (2014.11); *H04N 19/159* (2014.11); *H04N 19/46* (2014.11); *H04N 19/593* (2014.11); *H04N 19/70* (2014.11)

(58) Field of Classification Search
CPC ...... H04N 19/174; H04N 19/70; H04N 19/46; H04N 19/593; H04N 19/11; H04N 19/157; H04N 19/103; H04N 19/159
See application file for complete search history.

(56) References Cited

U.S. PATENT DOCUMENTS

| | | | |
|---|---|---|---|
| 2012/0189053 A1* | 7/2012 | Chen | H04N 7/462 375/240.12 |
| 2015/0063440 A1* | 3/2015 | Pang | H04N 19/00024 375/240.02 |

OTHER PUBLICATIONS

Bross, B., et al., "High Efficiency Video Coding (HEVC) text specification draft 10 (for FDIS & Last Call)," Document of Joint Collaborative Team on Video Coding, JCTVC-L1003_v34, 12th Meeting: Geneva, CH, Jan. 14-23, 2013.
Flynn, D., et al., "High Efficiency Video Coding (HEVC) Range Extensions text specification: Draft 4," JCTVC-N1005_v3, Aug. 2013.

(Continued)

*Primary Examiner* — Tat Chio
(74) *Attorney, Agent, or Firm* — Thomas A. Ward

(57) ABSTRACT

A method for decoding high efficiency video coding, comprising determining whether a coding unit is within an intra slice or an inter slice, determining whether intra block copy has been enabled, reviewing syntax for said coding unit for an intra block copy flag when the coding unit is within an intra slice and intra block copy has been enabled, and omitting reviewing the syntax for the intra block copy flag when the coding unit is within an inter slice.

19 Claims, 15 Drawing Sheets

(56) References Cited

OTHER PUBLICATIONS

Saxena, A., et al., "HEVC Range Extensions Core Experiment 3 (RCE3): Intra Prediction techniques," JCTVC-N1123, Joint Collaborative Team on Video Coding (JCT-VC) of ITU-T SG 16 WP 3 and ISO/IEC JTC 1/SC 29/WG 11, 14th Meeting, Vienna, Austria, Jul. 25-Aug. 2, 2013.
PCT Search Report & Written Opinion, RE: Application No. PCT/US2014/066149, dated Feb. 25, 2015.
D. Flynn, et al., "High Efficiency Video Coding (HEVC) Range Extension Draft 4", 14th JCT-VC Meeting (Joint Collaborative Team on Video Coding of ISO/IEC JTC1/SC29/WG11 and ITU-T SG.16), Aug. 8, 2013, pp. 47-91.
C. Pang, et al., "AhG5: Constrained intra prediction for intra block copying", 15th JCT-VC Meeting (Joint Collaborative Team on Video Coding of ISO/IEC JTC1/SC29/WG11 and ITU-T SG.16), Oct. 24, 2013, 8 pgs.
C. Pang, et al., "Non-RCE3: Intra Motion Compensation with 2-D MVs", 14th JCT-VC Meeting (Joint Collaborative Team on Video Coding of ISO/IEC JTC1/SC29/WG11 and ITU-T SG.16), Aug. 2, 2013, 12 pgs.
Y. Yu, et al., "Some Syntax Modifications for HEVC Range Extension", 16th JCT-VC Meeting (Joint Collaborative Team on Video Coding of ISO/IEC JTC1/SC29/WG11 and ITU-T SG.16), Jan. 4, 2014, 8 pgs.

\* cited by examiner

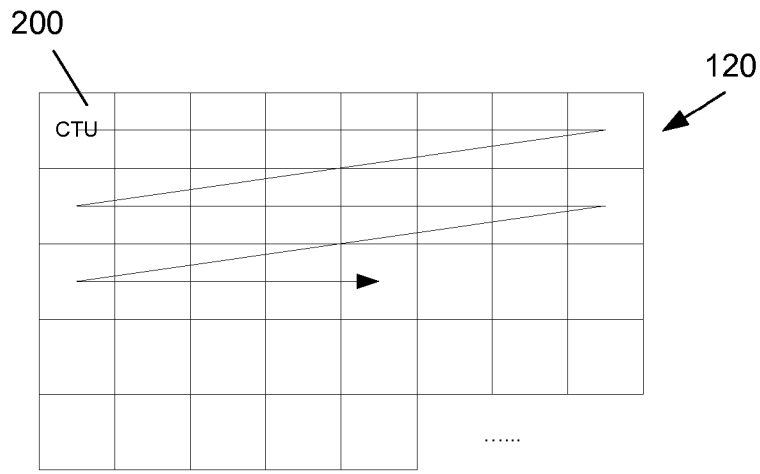
FIG. 2
*Prior Art*
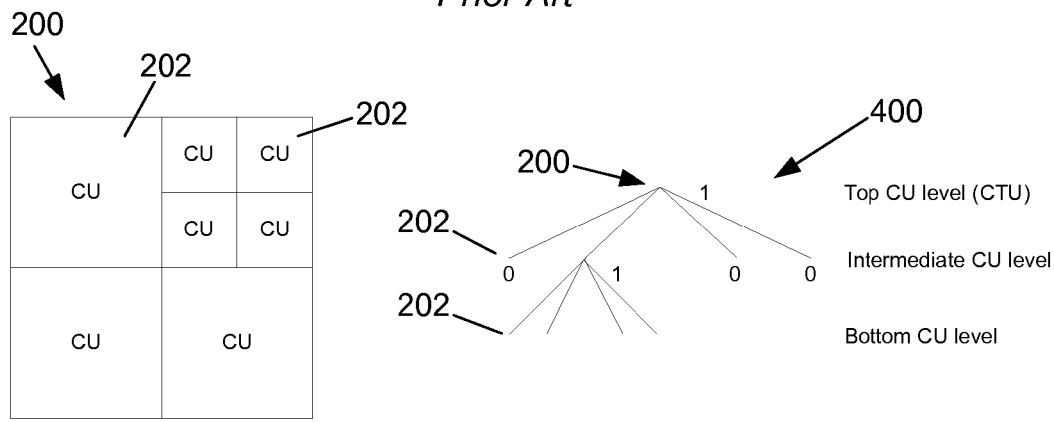
FIG. 3
*Prior Art*
FIG. 4
*Prior Art*
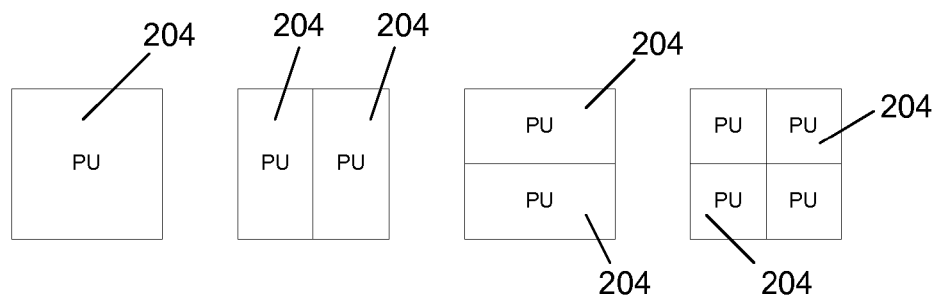
FIG. 5
*Prior Art*

| Syntax 1300 |||
|---|---|---|
| 1302 | Skip Flag | cu_skip_flag |
| 1304 | Intra Block Copy Slice Flag | intra_block_copy_enabled_flag |
| 1306 | Intra Block Copy Flag | intra_bc_flag |
| 1308 | Prediction Mode Flag | pred_mode_flag |

FIG. 13
*Prior Art*

```
coding_unit( x0, y0, log2CbSize ) {
    if( transquant_bypass_enabled_flag )
        cu_transquant_bypass_flag
    if( slice_type != I )
        cu_skip_flag[ x0 ][ y0 ]
    nCbS = ( 1 << log2CbSize )
    if( cu_skip_flag[ x0 ][ y0 ] )
        prediction_unit( x0, y0, nCbS, nCbS )
    else {
        if( intra_block_copy_enabled_flag )
            intra_bc_flag[ x0 ][ y0 ]
        if( !intra_bc_flag[ x0 ][ y0 ] ) {
            if( slice_type != I )
                pred_mode_flag
            if( CuPredMode[ x0 ][ y0 ] != MODE_INTRA ||
                log2CbSize == MinCbLog2SizeY )
                part_mode
        }
        if( CuPredMode[ x0 ][ y0 ] == MODE_INTRA ) {
            if( PartMode == PART_2Nx2N && pcm_enabled_flag && !intra_bc_flag
                log2CbSize >= Log2MinIpcmCbSizeY &&
                log2CbSize <= Log2MaxIpcmCbSizeY )
                pcm_flag[ x0 ][ y0 ]
            if( pcm_flag[ x0 ][ y0 ] ) {
                while( !byte_aligned( ) )
                    pcm_alignment_zero_bit
                pcm_sample( x0, y0, log2CbSize )
            } else if( intra_bc_flag[ x0 ][ y0 ] ) {
                mvd_coding( x0, y0, 2)
            } else {
                pbOffset = ( PartMode == PART_NxN ) ? ( nCbS / 2 ) : nCbS
                for( j = 0; j < nCbS; j = j + pbOffset )
                    for( i = 0; i < nCbS; i = i + pbOffset )
                        prev_intra_luma_pred_flag[ x0 + i ][ y0 + j ]
                for( j = 0; j < nCbS; j = j + pbOffset )
                    for( i = 0; i < nCbS; i = i + pbOffset )
                        if( prev_intra_luma_pred_flag[ x0 + i ][ y0 + j ] )
                            mpm_idx[ x0 + i ][ y0 + j ]
                        Else
                            rem_intra_luma_pred_mode[ x0 + i ][ y0 + j ]
                if( ChromaArrayType == 3 )
                    for( j = 0; j < nCbS; j = j + pbOffset )
                        for( i = 0; i < nCbS; i = i + pbOffset )
                            intra_chroma_pred_mode[ x0 + i ][ y0 + j ]
                else if( ChromaArrayType != 0 )
                    intra_chroma_pred_mode[ x0 ][ y0 ]
            }
        }
}
```

1500 (annotation pointing to intra_block_copy_enabled_flag and intra_bc_flag lines)

FIG. 15A

*Prior Art*

```
} else {
    if( PartMode == PART_2Nx2N )
        prediction_unit( x0, y0, nCbS, nCbS )
    else if( PartMode == PART_2NxN ) {
        prediction_unit( x0, y0, nCbS, nCbS / 2 )
        prediction_unit( x0, y0 + ( nCbS / 2 ), nCbS, nCbS / 2 )
    } else if( PartMode == PART_Nx2N ) {
        prediction_unit( x0, y0, nCbS / 2, nCbS )
        prediction_unit( x0 + ( nCbS / 2 ), y0, nCbS / 2, nCbS )
    } else if( PartMode == PART_2NxnU ) {
        prediction_unit( x0, y0, nCbS, nCbS / 4 )
        prediction_unit( x0, y0 + ( nCbS / 4 ), nCbS, nCbS * 3 / 4 )
    } else if( PartMode == PART_2NxnD ) {
        prediction_unit( x0, y0, nCbS, nCbS * 3 / 4 )
        prediction_unit( x0, y0 + ( nCbS * 3 / 4 ), nCbS, nCbS / 4 )
    } else if( PartMode == PART_nLx2N ) {
        prediction_unit( x0, y0, nCbS / 4, nCbS )
        prediction_unit( x0 + ( nCbS / 4 ), y0, nCbS * 3 / 4, nCbS )
    } else if( PartMode == PART_nRx2N ) {
        prediction_unit( x0, y0, nCbS * 3 / 4, nCbS )
        prediction_unit( x0 + ( nCbS * 3 / 4 ), y0, nCbS / 4, nCbS )
    } else { /* PART_NxN */
        prediction_unit( x0, y0, nCbS / 2, nCbS / 2 )
        prediction_unit( x0 + ( nCbS / 2 ), y0, nCbS / 2, nCbS / 2 )
        prediction_unit( x0, y0 + ( nCbS / 2 ), nCbS / 2, nCbS / 2 )
        prediction_unit( x0 + ( nCbS / 2 ), y0 + ( nCbS / 2 ), nCbS / 2, nCbS / 2 )
    }
}
if( !pcm_flag[ x0 ][ y0 ] ) {
    if( CuPredMode[ x0 ][ y0 ] != MODE_INTRA &&
        !( PartMode == PART_2Nx2N && merge_flag[ x0 ][ y0 ] ) ||
        CuPredMode[ x0 ][ y0 ] == MODE_INTRA && intra_bc_flag[ x0 ][ y0 ] )
        rqt_root_cbf
    if( rqt_root_cbf ) {
        MaxTrafoDepth = ( CuPredMode[ x0 ][ y0 ] == MODE_INTRA ?
                        ( max_transform_hierarchy_depth_intra + IntraSplitFlag ) :
                        max_transform_hierarchy_depth_inter )
        transform_tree( x0, y0, x0, y0, log2CbSize, 0, 0 )
    }
}
}
}
}
```

FIG. 15B

*Prior Art*

```
coding_unit( x0, y0, log2CbSize ) {
    if( transquant_bypass_enabled_flag )
        cu_transquant_bypass_flag
    if( slice_type != I )
        cu_skip_flag[ x0 ][ y0 ]                          ⎫
    else if( intra_block_copy_enabled_flag )              ⎬  1700
        intra_bc_flag[ x0 ][ y0 ]                         ⎭
    nCbS = ( 1 << log2CbSize )
    if( cu_skip_flag[ x0 ][ y0 ] )
        prediction_unit( x0, y0, nCbS, nCbS )
    else {
        if( !intra_bc_flag[ x0 ][ y0 ] ) {
            if( slice_type != I )
                pred_mode_flag
            if( CuPredMode[ x0 ][ y0 ] != MODE_INTRA ||
                log2CbSize == MinCbLog2SizeY )
                part_mode
        }
        if( CuPredMode[ x0 ][ y0 ] == MODE_INTRA ) {
            if( PartMode == PART_2Nx2N && pcm_enabled_flag && !intra_bc_flag
                log2CbSize >= Log2MinIpcmCbSizeY &&
                log2CbSize <= Log2MaxIpcmCbSizeY )
                pcm_flag[ x0 ][ y0 ]
            if( pcm_flag[ x0 ][ y0 ] ) {
                while( !byte_aligned( ) )
                    pcm_alignment_zero_bit
                pcm_sample( x0, y0, log2CbSize )
            } else if( intra_bc_flag[ x0 ][ y0 ] ) {
                mvd_coding( x0, y0, 2)
            } else {
                pbOffset = ( PartMode == PART_NxN ) ? ( nCbS / 2 ) : nCbS
                for( j = 0; j < nCbS; j = j + pbOffset )
                    for( i = 0; i < nCbS; i = i + pbOffset )
                        prev_intra_luma_pred_flag[ x0 + i ][ y0 + j ]
                for( j = 0; j < nCbS; j = j + pbOffset )
                    for( i = 0; i < nCbS; i = i + pbOffset )
                        if( prev_intra_luma_pred_flag[ x0 + i ][ y0 + j ] )
                            mpm_idx[ x0 + i ][ y0 + j ]
                        Else
                            rem_intra_luma_pred_mode[ x0 + i ][ y0 + j ]
                if( ChromaArrayType == 3 )
                    for( j = 0; j < nCbS; j = j + pbOffset )
                        for( i = 0; i < nCbS; i = i + pbOffset )
                            intra_chroma_pred_mode[ x0 + i ][ y0 + j ]
                else if( ChromaArrayType != 0 )
                    intra_chroma_pred_mode[ x0 ][ y0 ]
            }
        }
```

FIG. 17A

```
} else {
    if( PartMode  = =  PART_2Nx2N )
        prediction_unit( x0, y0, nCbS, nCbS )
    else if( PartMode  = =  PART_2NxN ) {
        prediction_unit( x0, y0, nCbS, nCbS / 2 )
        prediction_unit( x0, y0 + ( nCbS / 2 ), nCbS, nCbS / 2 )
    } else if( PartMode  = =  PART_Nx2N ) {
        prediction_unit( x0, y0, nCbS / 2, nCbS )
        prediction_unit( x0 + ( nCbS / 2 ), y0, nCbS / 2, nCbS )
    } else if( PartMode  = =  PART_2NxnU ) {
        prediction_unit( x0, y0, nCbS, nCbS / 4 )
        prediction_unit( x0, y0 + ( nCbS / 4 ), nCbS, nCbS * 3 / 4 )
    } else if( PartMode  = =  PART_2NxnD ) {
        prediction_unit( x0, y0, nCbS, nCbS * 3 / 4 )
        prediction_unit( x0, y0 + ( nCbS * 3 / 4 ), nCbS, nCbS / 4 )
    } else if( PartMode  = =  PART_nLx2N ) {
        prediction_unit( x0, y0, nCbS / 4, nCbS )
        prediction_unit( x0 + ( nCbS / 4 ), y0, nCbS * 3 / 4, nCbS )
    } else if( PartMode  = =  PART_nRx2N ) {
        prediction_unit( x0, y0, nCbS * 3 / 4, nCbS )
        prediction_unit( x0 + ( nCbS * 3 / 4 ), y0, nCbS / 4, nCbS )
    } else { /* PART_NxN */
        prediction_unit( x0, y0, nCbS / 2, nCbS / 2 )
        prediction_unit( x0 + ( nCbS / 2 ), y0, nCbS / 2, nCbS / 2 )
        prediction_unit( x0, y0 + ( nCbS / 2 ), nCbS / 2, nCbS / 2 )
        prediction_unit( x0 + ( nCbS / 2 ), y0 + ( nCbS / 2 ), nCbS / 2, nCbS / 2 )
    }
}
if( !pcm_flag[ x0 ][ y0 ] ) {
    if( CuPredMode[ x0 ][ y0 ] != MODE_INTRA &&
        !( PartMode  = =  PART_2Nx2N && merge_flag[ x0 ][ y0 ] ) ||
        CuPredMode[ x0 ][ y0 ]  = =  MODE_INTRA && intra_bc_flag[ x0 ][ y0 ] )
        rqt_root_cbf
    if( rqt_root_cbf ) {
        MaxTrafoDepth = ( CuPredMode[ x0 ][ y0 ]  = =  MODE_INTRA ?
                        ( max_transform_hierarchy_depth_intra + IntraSplitFlag ) :
                        max_transform_hierarchy_depth_inter )
        transform_tree( x0, y0, x0, y0, log2CbSize, 0, 0 )
    }
}
}
}
```

FIG. 17B

INTRA BLOCK COPY FOR INTRA SLICES IN HIGH EFFICIENCY VIDEO CODING (HEVC)

CLAIM OF PRIORITY

This Application claims priority under 35 U.S.C. §119(e) from earlier filed U.S. Provisional Application Ser. No. 61/905,822, filed Nov. 18, 2013, which is hereby incorporated by reference.

TECHNICAL FIELD

The present disclosure relates to the field of video compression, particularly video compression using High Efficiency Video Coding (HEVC).

BACKGROUND

High Efficiency Video Coding (HEVC) is a video coding standard being developed to provide improved video compression when compared to previous standards such as H.264/MPEG-4 Advanced Video Coding (AVC), in order to better handle the large amounts of data present in high resolution video files. HEVC is a block-based hybrid spatial and temporal predictive coding scheme in which an input image, such as a video frame, is divided into square blocks called coding tree units (CTUs). Unlike many other video coding schemes that break input images into macroblocks of 16×16 pixels, each CTU in HEVC can be as large as 64×64 pixels. Each CTU can then be recursively divided into one or more levels of smaller square blocks called Coding Units (CUs) that are coded.

In HEVC, prediction units (PUs) within each individual CU can be coded with intra prediction or inter prediction. Coding a PU with intra prediction uses spatial prediction, in which a predicted PU is predicted from a spatial prediction direction based on neighboring pixels around the PU being coded, and the spatial prediction direction is coded in syntax. Coding with inter prediction uses temporal prediction, in which predicted PU motion compensation blocks that are similar to the PU being coded are found in other image slices within the same or different input images. Motion vectors are coded in syntax that point to predicted PU motion compensation blocks in other image slices, along with an index identifying reference pictures in which the other image slices appear.

In some embodiments or extensions of HEVC algorithms, a technique called intra block copy (IBC) can be alternately used when coding an input image. Coding a CU using intra block copy can be done by finding an intra block copy compensation block that is similar to the CU being coded within the same image slice as the CU being coded. A intra block copy vector can be coded in syntax that points to the intra block copy compensation block. As such, intra block copy vectors and intra block copy compensation blocks for a CU can be similar to the motion vectors that point to motion compensation blocks used when coding PUs with inter prediction, expect that the intra block copy compensation blocks are within the same slice as the CU being coded.

Intra block copy offer improved compression in many situations when compared to only using intra prediction and inter prediction. For example, because an individual slice often contains repeated patterns, an intra block compensation block found at another position in the same slice can often be more similar to the CU being coded than predicted PUs generated through spatial prediction.

However, an even closer match for a CU than the one found through intra block copy can often be found in another slice using the temporal prediction of inter prediction. For example, when coding a video sequence showing a ball moving from the top left corner of the screen to the lower right corner of the screen, coding the CU showing a portion of the ball can be more efficiently coded by referring to areas of previous or subsequent images that show the same portion of the ball rather than coding another portion of the same slice that may not show the ball. As such, intra block copy is often irrelevant when coding CUs within inter slices.

Most existing HEVC coding systems add an intra block copy flag to each and every CU when coding with intra block copy. This intra block copy flag indicates whether or not intra block copy was used when coding the CU. However, because intra block copy is often irrelevant when coding CUs within inter slices, having an encoder add an intra block copy flag to every CU, even ones for which the intra block copy information is generally irrelevant, the addition of the intra block copy flag adds an unnecessary bit to the bitstream, and also wastes time and processor cycles. It also wastes time and processor cycles for a decoding system, because the decoding system checks each CU for the value of its intra block copy flag, even when the information provided by the intra block copy flag is likely not relevant for CUs in inter slices.

SUMMARY

What is needed is a process for using intra block copy only when coding or decoding CUs within intra slices, and disabling intra block copy or omitting steps related to intra block copy when coding or decoding CUs within inter slices.

In one embodiment, the present disclosure provides for a method for decoding high efficiency video coding, the method comprising determining whether a coding unit is within an intra slice or an inter slice, determining whether intra block copy has been enabled, reviewing syntax for the coding unit for an intra block copy flag when the coding unit is within an intra slice and intra block copy has been enabled, and omitting reviewing the syntax for the intra block copy flag when the coding unit is within an inter slice.

In another embodiment, the present disclosure provides for a method for high efficiency video coding, the method comprising determining whether a coding unit is within an intra slice or an inter slice, determining whether intra block copy has been enabled, adding an intra block copy flag to the coding unit's syntax when the coding unit is within an intra slice and intra block copy has been enabled, and omitting the intra block copy flag from the coding unit's syntax when the coding unit is within an inter slice.

In yet another embodiment, the present disclosure provides for decoding system for high efficiency video coding, the decoding system comprising a decoder configured to determine whether a coding unit is within an intra slice or an inter slice, determine whether intra block copy has been enabled, review syntax for the coding unit for an intra block copy flag when the coding unit is within an intra slice and intra block copy has been enabled, and omit reviewing the syntax for the intra block copy flag when the coding unit is within an inter slice.

BRIEF DESCRIPTION OF THE DRAWINGS

Further details of the present invention are explained with the help of the attached drawings in which:

FIG. 2 depicts an exemplary division of a source picture into a plurality of coding tree units (CTUs).

FIG. 3 depicts an exemplary division of a CTU into smaller Coding Units (CUs).

FIG. 4 depicts an exemplary embodiment of a quadtree data representation of the division of a CTU into smaller levels of CUs.

FIG. 5 depict exemplary arrangements of prediction units (PUs) broken out from a CU.

FIG. 13 depict non-limiting examples of syntax elements.

FIGS. 15A-15B depict previous code for coding a CU and adding syntax, in which an intra block copy flags are added to CUs in both intra slices and inter slices.

FIGS. 17A-17B depict exemplary code for coding a CU and adding syntax, in which intra block copy flags are added only to CUs within intra slices and intra block copy is disabled when coding CUs within inter slices.

DETAILED DESCRIPTION

Figure 1:
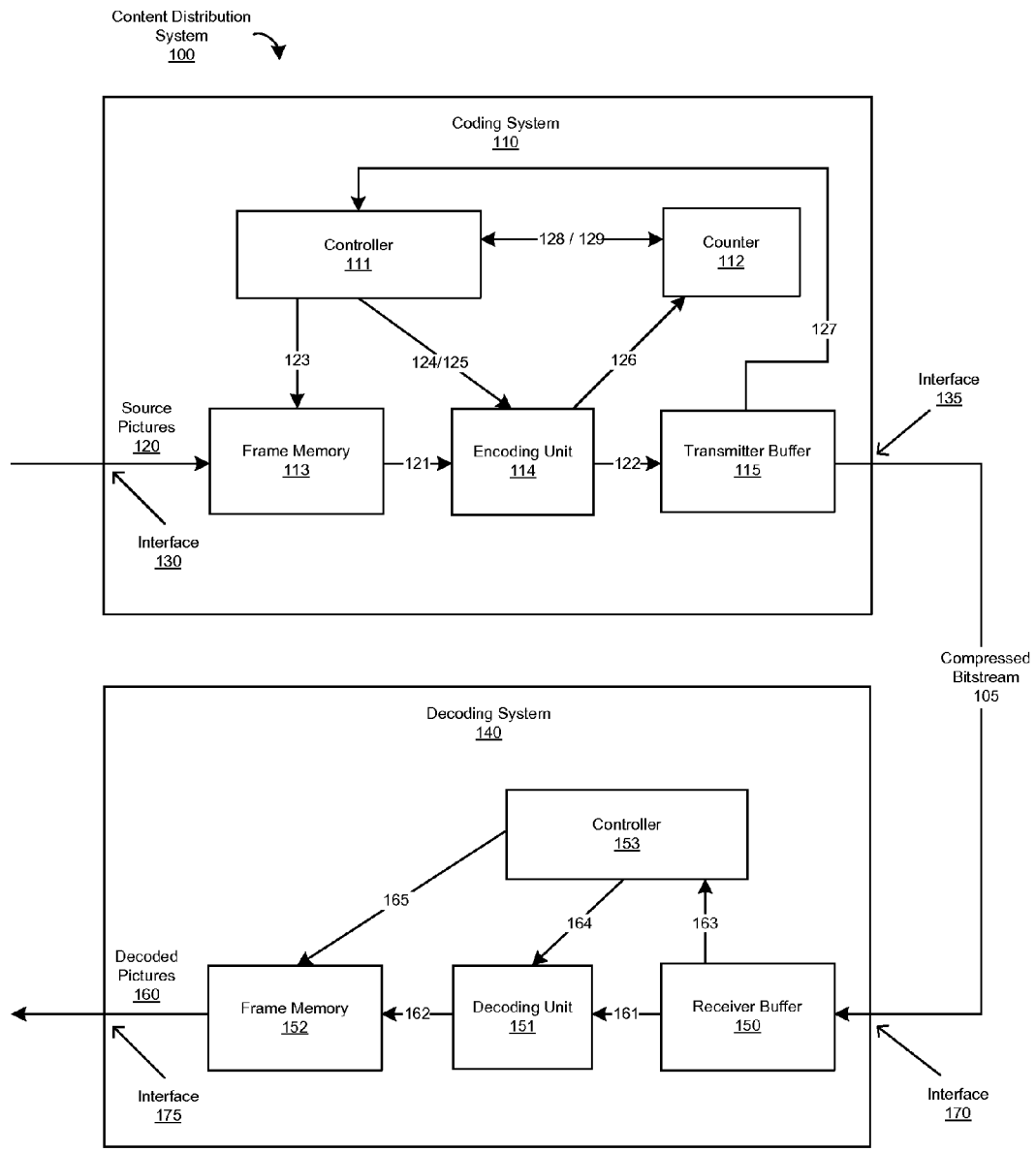
FIG. 1 depicts an exemplary embodiment of a content distribution system comprising a coding system and a decoding system.

FIG. 1 depicts an exemplary embodiment of a content distribution system 100 comprising a coding system 110 and a decoding system 140 that can be used to encode, decode, transmit, and/or receive High Efficiency Video Coding (HEVC) data according to the methods described below. In various embodiments, the coding system 110 can be incorporated or otherwise associated with a transcoder or an encoding apparatus at a headend, and the decoding system 140 can be incorporated or otherwise associated with a downstream device, such as a mobile device, a set top box, or a transcoder.

In some embodiments, a coding system 110 can comprise an input interface 130, a controller 111, a counter 112, a frame memory 113, an encoding unit 114, a transmitter buffer 115 and an output interface 135. In some embodiments, a decoding system 140 can comprise a receiver buffer 150, a decoding unit 151, a frame memory 152 and a controller 153. The coding system 110 and the decoding system 140 can be coupled with each other via a transmission path which can carry a compressed bitstream 105. The controller 111 of the coding system 110 can control the amount of data to be transmitted on the basis of the capacity of the receiver buffer 150 and can include other parameters such as the amount of data per a unit of time. The controller 111 can control the encoding unit 114 to prevent the occurrence of a failure of a received signal decoding operation of the decoding system 140. The controller 111 can be a processor or include, by way of a non-limiting example, a microcomputer having a processor, a random access memory and a read only memory.

Source pictures 120 supplied from, by way of a non-limiting example, a content provider can include a video sequence of frames including source pictures 120 in a video sequence. The source pictures 120 can be uncompressed or compressed. If the source pictures 120 are uncompressed, the coding system 110 can have an encoding function. If the source pictures 120 are compressed, the coding system 110 can have a transcoding function. Coding Tree Units (CTUs) 200 and/or Coding Units (CUs) 202 can be derived from the source pictures 120 utilizing the controller 111, as will be described below. The frame memory 113 can have a first area that can be used for storing the incoming frames from the source pictures 120 and a second area that can be used for reading out the frames and outputting them to the encoding unit 114. The controller 111 can output an area switching control signal 123 to the frame memory 113. The area switching control signal 123 can indicate whether the first area or the second area is to be utilized.

The controller 111 can output an encoding control signal 124 to the encoding unit 114. The encoding control signal 124 can cause the encoding unit 114 to start an encoding operation, such as preparing the CUs 202 based on a source picture 120. In response to the encoding control signal 124 from the controller 111, the encoding unit 114 can begin to read out the prepared CUs 202 to a high-efficiency video encoding process, as will be described below, which processes the prepared CUs 202 to generate video compression data based on the source pictures 120.

The encoding unit 114 can package the generated video compression data in a packetized elementary stream (PES) including video packets. The encoding unit 114 can map the video packets into an encoded video signal 122 using control information and a program time stamp (PTS) and the encoded video signal 122 can be transmitted to the transmitter buffer 115.

The encoded video signal 122, including the generated video compression data, can be stored in the transmitter buffer 115. The information amount counter 112 can be incremented to indicate the total amount of data in the transmitter buffer 115. As data is retrieved and removed from the buffer, the counter 112 can be decremented to reflect the amount of data in the transmitter buffer 115. The occupied area information signal 126 can be transmitted to the counter 112 to indicate whether data from the encoding unit 114 has been added or removed from the transmitted buffer 115 so the counter 112 can be incremented or decremented. The controller 111 can control the production of video packets produced by the encoding unit 114 on the basis of the occupied area information 126 which can be communicated in order to anticipate, avoid, prevent, and/or detect an overflow or underflow from taking place in the transmitter buffer 115.

The information amount counter 112 can be reset in response to a preset signal 128 generated and output by the controller 111. After the information counter 112 is reset, it can count data output by the encoding unit 114 and obtain the amount of video compression data and/or video packets which have been generated. The information amount counter 112 can supply the controller 111 with an information amount signal 129 representative of the obtained amount of information. The controller 111 can control the encoding unit 114 so that there is no overflow at the transmitter buffer 115.

In some embodiments, the decoding system 140 can comprise an input interface 170, a receiver buffer 150, a controller 153, a frame memory 152, a decoding unit 151 and an output interface 175. The receiver buffer 150 of the decoding system 140 can temporarily store the compressed bitstream 105, including the received video compression data and video packets based on the source pictures from the source pictures 120. The decoding system 140 can read the control information and presentation time stamp information associated with video packets in the received data and output a frame number signal 163 which can be applied to the controller 153. The controller 153 can supervise the counted number of frames at a predetermined interval. By way of a non-limiting example, the controller 153 can supervise the counted number of frames each time the decoding unit 151 completes a decoding operation.

In some embodiments, when the frame number signal 163 indicates the receiver buffer 150 is at a predetermined capacity, the controller 153 can output a decoding start signal 164 to the decoding unit 151. When the frame number signal 163 indicates the receiver buffer 150 is at less than a predetermined capacity, the controller 153 can wait for the occurrence of a situation in which the counted number of frames becomes equal to the predetermined amount. The controller 153 can output the decoding start signal 164 when the situation occurs. By way of a non-limiting example, the controller 153 can output the decoding start signal 164 when the frame number signal 163 indicates the receiver buffer 150 is at the predetermined capacity. The encoded video packets and video compression data can be decoded in a monotonic order (i.e., increasing or decreasing) based on presentation time stamps associated with the encoded video packets.

In response to the decoding start signal 164, the decoding unit 151 can decode data amounting to one picture associated with a frame and compressed video data associated with the picture associated with video packets from the receiver buffer 150. The decoding unit 151 can write a decoded video signal 162 into the frame memory 152. The frame memory 152 can have a first area into which the decoded video signal is written, and a second area used for reading out decoded pictures 160 to the output interface 175.

FIG. 2 shows the division of a source picture 120, such as a video frame, into a plurality of coding tree units (CTUs) 200. In High Efficiency Video Coding (HEVC), an input image can be divided into a plurality of CTUs 200. In some embodiments, CTUs 200 can also or alternately be called Large Coding Units (LCUs). Each CTU 200 can be a square block of pixels, up to a size of 64×64 pixels.

Each CTU 200 can be divided recursively into smaller square blocks of pixels called Coding Units (CUs) 202. By way of a non-limiting example, a CTU 200 can be divided into four square CUs 202 that are each a quarter size of the larger CTU 200, as shown in FIG. 3. Each individual CU 202 can also be split into four smaller CUs 202 if the parent CU 202 contains sufficiently varied pixels. By way of a non-limiting example, the CU 202 in the upper right corner of the CTU 200 depicted in FIG. 3 can be divided into four smaller CUs 202. Any of the smaller CUs 202 can be further split into even smaller CUs 202, which can themselves be split into smaller CUs 202, and so on recursively down to a predetermined minimum size. By way of a non-limiting example, a CTU 200 that has one corner with pixels displaying a lot of image detail and many colors and another corner with pixels displaying fewer details and fewer colors can be divided to have one large CU 202 in the corner with less detail and many smaller CUs 202 in the corner with more detail.

A quadtree data representation 400 can be used to describe the partitioning of a CTU 200 into multiple levels of smaller CUs 202. The quadtree data representation 400 can have nodes corresponding to the CTU 200 and CUs 202. At each node of the quadtree data representation 400, a flag of "1" can be assigned if the CTU 200 or CU 202 is split into four smaller CUs 202. If a CTU 200 or CU 202 at a node is not split into smaller CUs 202, a flag of "0" can be assigned. By way of a non-limiting example, the quadtree data representation 400 shown in FIG. 4 can describe the CTU partition shown in FIG. 3, in which the CTU 200 is split into four CUs 202, and the upper right CU 202 is split into four even smaller CUs 202. A binary data representation called a CU split flag that comprises the flags assigned at each node of quadtree data representation 400 can be coded and transmitted as overhead in the HEVC bitstream 105, along with other data such as a skip mode flag, a merge mode flag, and a flag for a coding mode. By way of a non-limiting example, the quadtree data representation 400 shown in FIG. 4 can be coded as the CU split flag binary data representation "10100."

Each of the final CUs 202 at the lowest level of each leaf of the quadtree data representation 400 can be encoded using either intra prediction or inter prediction, as will be discussed below. To code a CU 202, the CU 202 can be broken into one or more prediction units (PUs) 204. Some CUs 202 can have one PU 204 that is the same size as the CU 202, while other CUs 202 can be broken up into multiple smaller PUs 204. PUs 204 can be either square or rectangular. By way of non-limiting examples, a CU 202 with dimensions of 2N×2N can be broken up into one of the four exemplary arrangements of PUs 204 shown in FIG. 5, with the PUs 204 having dimensions of 2N×2N, 2N×N, N×2N, or N×N.

Figure 6:
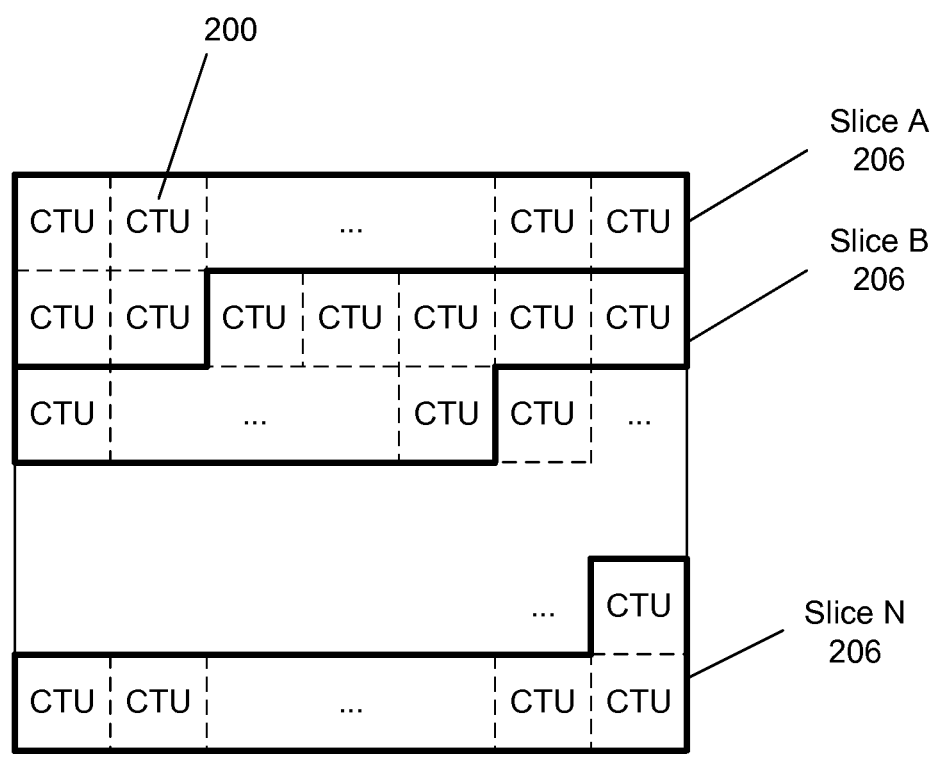
FIG. 6 depicts an image broken into multiple slices 206.

In some situations and/or embodiments, an input image can be broken up into one or more slices 206. A slice 206 can be either an entire image, or a smaller portion of an image. By way of a non-limiting example, FIG. 6 displays an image broken into multiple slices 206 in raster order, with each slice 206 having a plurality of CTUs 200. As discussed above, each CTU 200 can further be broken into one or more levels of CUs 202. The PUs 204 of each CU 202 within each slice 206 can be coded in part by finding predicted PUs 208 using intra prediction or inter prediction.

Figure 7:
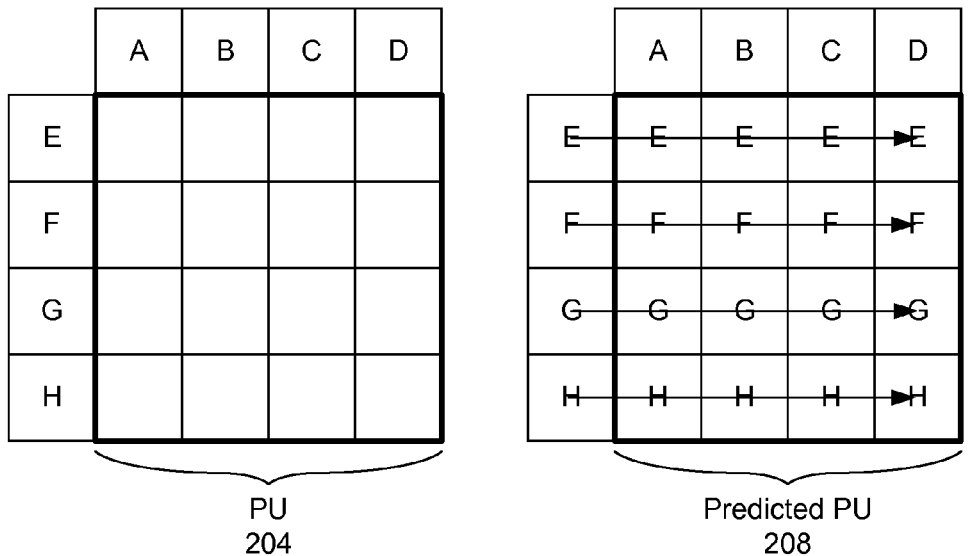
FIG. 7 depicts an example of intra prediction, in which a predicted PU is generated via spatial prediction.

For intra prediction, predicted PUs 208 can be predicted using spatial prediction based on previously coded PUs 204 within the same slice 206. A spatial prediction direction or mode can be used to predict the pixels of a predicted PU 208 based on bordering pixels in neighboring PUs 204 that have already been coded. In some embodiments of HEVC, there can be up to 35 possible spatial prediction directions and modes that can used to predict the pixels of a predicted PU 208, including horizontal, vertical, 45-degree diagonal, 135 degree diagonal, DC mode, planar mode, and other directions. By way of a non-limiting example, FIG. 7 depicts a predicted PU 208 predicted from a PU 204 using a horizontal spatial prediction direction, such that the column of pixels immediately to the left of a PU 204, within a previously coded PU 204 in the slice 206, can be copied horizontally across each column to obtain a predicted PU 208 for the PU 204 being coded. The spatial prediction direction or mode used to predict the predicted PU 208 can be coded as a syntax element in the HEVC bitstream 105. Description of a residual PU 210 that indicates the differences between the original PU 204 and the predicted PU 208 can also be coded in the HEVC bitstream 105, as will be discussed below.

Figure 8:
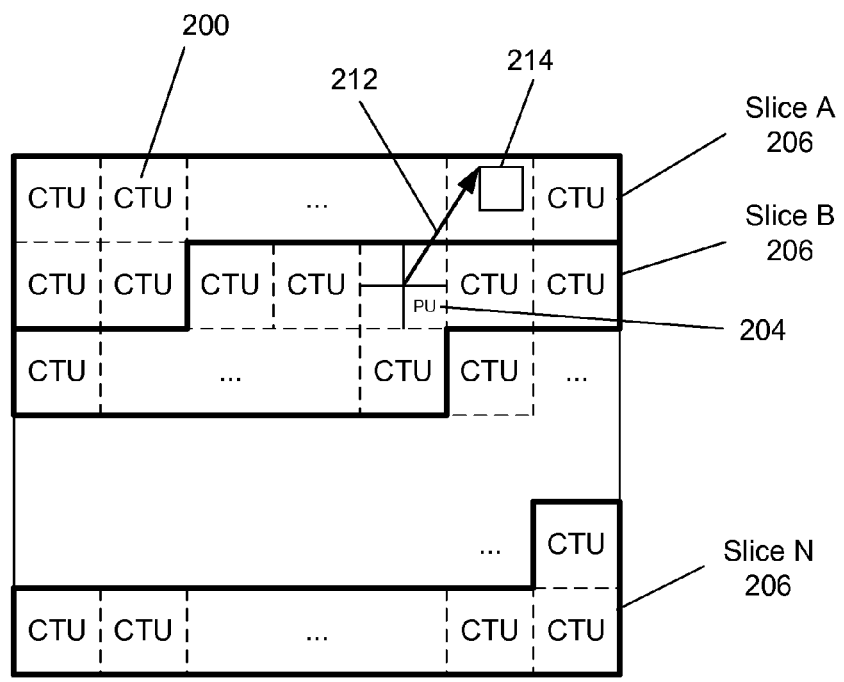
FIG. 8 depicts an example of inter prediction, in which a predicted PU is found in a different slice via temporal prediction.

For inter prediction, predicted PUs 208 can be found for a PU 204 in other slices 206 using temporal prediction, as shown in FIG. 8. The other slices 206 can be either in the same image, or in a previous or subsequent image in a video sequence. A motion vector 212 can be found that points to a motion compensation block 214 in a different slice 206 that that is the best match prediction for the PU 204 being coded. The motion compensation block 214 can be used as the predicted PU 208 for the PU 204 being coded. The motion vector 212 can be a two dimensional vector that describes the movement of the top-left pixel between the PU 204 being coded and the motion compensation block 214 found in the previous or subsequent slice 206. Images that contain a slice 206 in which a motion compensation block 214 appears can be referred to as reference images. Each PU 204 of a CU 202 coded with inter prediction can be coded with syntax elements in the HEVC bitstream 105 that describe motion vectors 212 that point to the predicted PUs 208/motion compensation blocks 214 in reference images, as well as an index identifying the reference images. Additionally, description of a residual PU 210 that indicates the differences between the original PU 204 and the predicted PUs 208/motion compensation blocks 214 can be coded in the HEVC bitstream 105. In some cases, the predicted PU 208/motion compensation block 214 in another slice 206 can be identical to the current PU 204, such that no residual PU 210 would be found. In these cases, the PU 204 can be coded in inter skip mode, in which information about the residual PU 210 is not coded and only the motion vector 212 describing the position of the predicted PU 208/motion compensation block 214 and the identity of the reference image are coded.

Slices 206 whose CUs 202 have PUs 204 coded only with intra prediction can be referred to as "I" slices. "I" slices are often used to begin decoding, as they do not rely on motion vectors 212 that refer to other slices 206, and thus contain all information needed to decode the slice 206. In some embodiments of HEVC, slices 206 that have one or more CUs 202 coded with inter prediction can be referred to as "P" slices if they are coded with motion vectors 212 that point to predicted PUs 208 in previous slices 206, and "B" slices if they are coded with motion vectors 212 that point to predicted PUs 208 in both previous and subsequent slices 206. In other embodiments, slices 206 that have one or more CUs 202 coded with inter prediction can be referred to as "B" slices regardless of whether their motion vectors 212 refer previous or subsequent slices 206.

Figure 9:
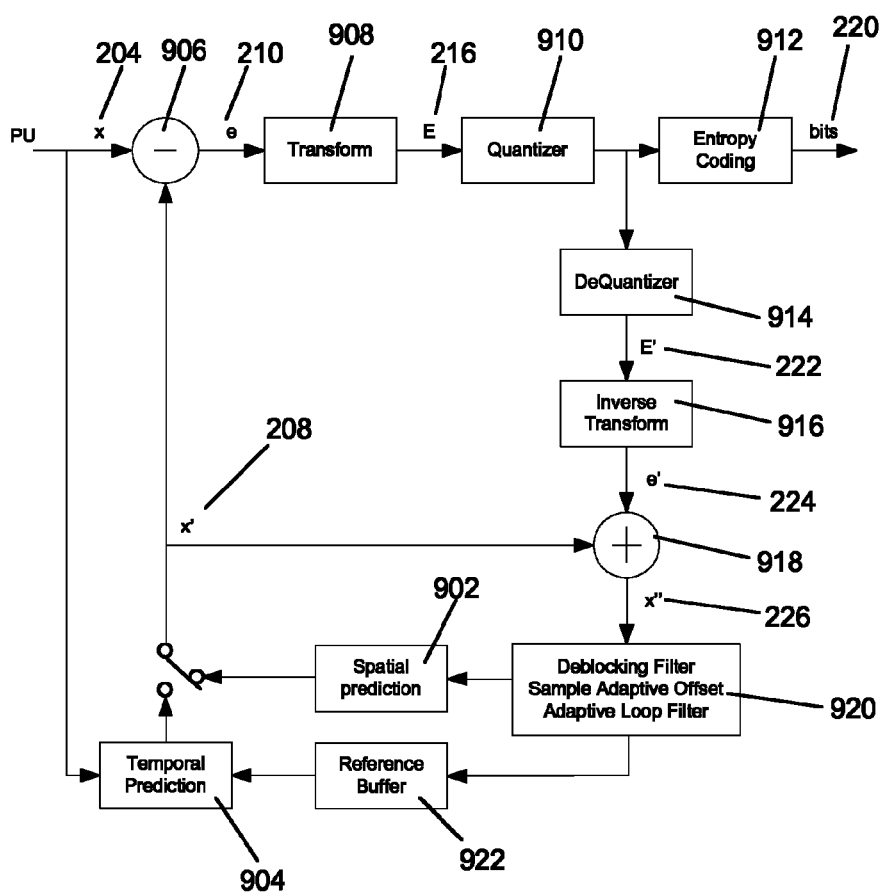
FIG. 9 depicts a block diagram of how CUs of an image frame can be encoded using inter prediction and/or intra prediction.

FIG. 9 depicts a block diagram of how CUs 202 of an image frame can be encoded using inter prediction and/or intra prediction. For each PU 204 (x) of a CU 202, a predicted PU 208 (x') can be obtained through either intra prediction using spatial prediction at 902, or through inter prediction using temporal prediction at 904, as described above.

At 906, the predicted PU 208 (x') found through intra or inter prediction can be subtracted from the current PU 204 (x) to obtain a residual PU 210 (e). As mentioned above, if the current PU 204 is being coded with inter prediction, information about the residual PU 210 (e) can be coded along with the motion vector 212 found through temporal prediction that points to the predicted PU 208 in an associated reference image, and information identifying the associated reference image. However, if the predicted PU 208 found through temporal prediction is identical to the current PU 204, such that there is no difference when subtracting them and the residual PU 210 would be empty, an inter skip mode flag can be coded in the bitstream 105 to indicate that the current PU 204 is being coded with the motion vector 212 and reference image index without information describing a residual PU 210.

Figure 10:
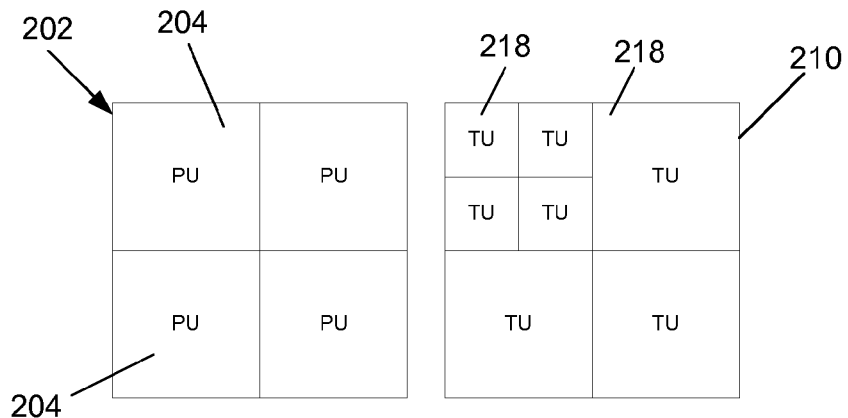
FIG. 10 depicts exemplary divisions of a CU into PUs and transform units (TUs).
Figure 11:
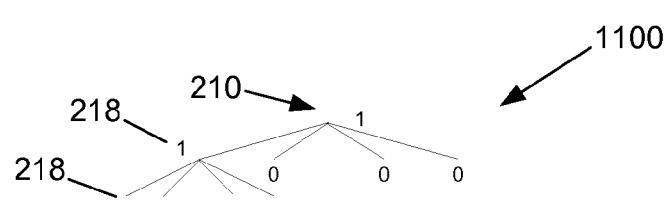
FIG. 11 depicts an exemplary embodiment of a quadtree data representation of the division of a predicted PU into TUs.

At 908, if it exists, the residual PU 210 (e) can be transformed into transform coefficients 216 (E) with a square block transform. The residual PU 210 (e) can be broken into one or more transform units (TUs) 218. The block transform can tend to decorrelate pixels within the TUs 218 and compact the energy of the TUs 218 into low order transform coefficients 216 (E). As shown in FIG. 10, some residual PUs 210 can be divided into smaller TUs 218 and other residual PUs 210 can have a single TU 218 that is the same size as the residual PU 210. Division of residual PUs 210 into TUs 218 can be shown by a quadtree data representation 1100. By way of a non-limiting example, the quadtree data representation 1100 shown in FIG. 11 depicts the arrangement of TUs 218 broken out from the residual PUs 210 for the CU 202 shown in FIG. 10. The quadtree data representation 1100 describing the arrangement of TUs 218 can be coded and transmitted as part of the HEVC bitstream 105.

Referring back to FIG. 9, at 910 the transform coefficients 216 (E) can be quantized into one of a finite number of possible values. In some embodiments, this can be a lossy operation in which data lost by quantization might not be recoverable. After the transform coefficients 216 have been quantized, at 912 the quantized transform coefficients 216 can be entropy coded to obtain final compression bits 220 for the HEVC bitstream 105. Entropy coding can be performed using context-adaptive variable-length coding (CAVLC), context-adaptive binary arithmetic coding (CABAC), or any other entropy coding technique. The final compression bits 220 can be output in the HEVC bitstream 105, along with coded syntax elements.

To generate reference images that can be used for temporal prediction of subsequently coded slices 206 that would match the decoded images that would be reconstructed by a decoding system 140, a coding system 110 can at 914 dequantize the quantized transform coefficients 216 into dequantized transform coefficients 222 (E'). At 916 the dequantized transform coefficients 222 (E') can be inverse transformed to create a reconstructed residual PU 224 (e'). At 918 the reconstructed residual PU 224 (e') can be added to a corresponding prediction PU 208 (x'), obtained through either spatial prediction at 902 or temporal prediction at 904, to obtain a reconstructed PU 226 (x"). At 920 a deblocking filter can be used on reconstructed PUs 226 (x") to reduce blocking artifacts. At 920 a sample adaptive offset process can also be provided that can be conditionally performed to compensate the pixel value offset between reconstructed pixels and original pixels. Further, at 920, an adaptive loop filter can be conditionally used on the reconstructed PUs 226 (x") to reduce or minimize coding distortion between input and output images. If a reconstructed image is a reference image that might be used for future temporal prediction in inter prediction coding, the reconstructed images can be stored in a reference buffer 922.

When the compression bits 220 are received by a decoding system 140, the bitstream 105 can be decoded by following steps similar to those of 914-920, in which the dequantized transform coefficients 222 (E') can be inverse transformed to obtain a reconstructed residual PU 224 (e'), the reconstructed residual PU 224 (e') can be added to a prediction PU 208 (e') identified in syntax within previously decoded data by a spatial prediction direction or a motion vector 212 to obtain a reconstructed PU 226 (x"). The decoding system 140 can additionally use a deblocking filter, sample adaptive offset process, and/or adaptive loop filter to help reconstruct the original pixels.

While FIGS. 2-11 depict elements of a standard embodiment of HEVC, some extensions or embodiments of HEVC can also use intra block copy (IBC) when coding PUs 204 and/or full CUs 202. By way of a non-limiting example, screen content coding extensions for HEVC have been proposed that use intra block copy as an option for coding CUs 202 and/or PUs 204 in addition to coding through other methods such as intra prediction and inter prediction. In some embodiments, coding with intra block copy can be done at the PU 204 level individually for each PU 204 within a CU 202. In other embodiments, coding with intra block copy can be done for a complete CU 202 without coding its PUs 204 separately. In the discussion below, coding with intra block copy will be discussed at the CU 202 level, however it should be understood that the same processes could be followed at the PU 204 level.

Figure 12:
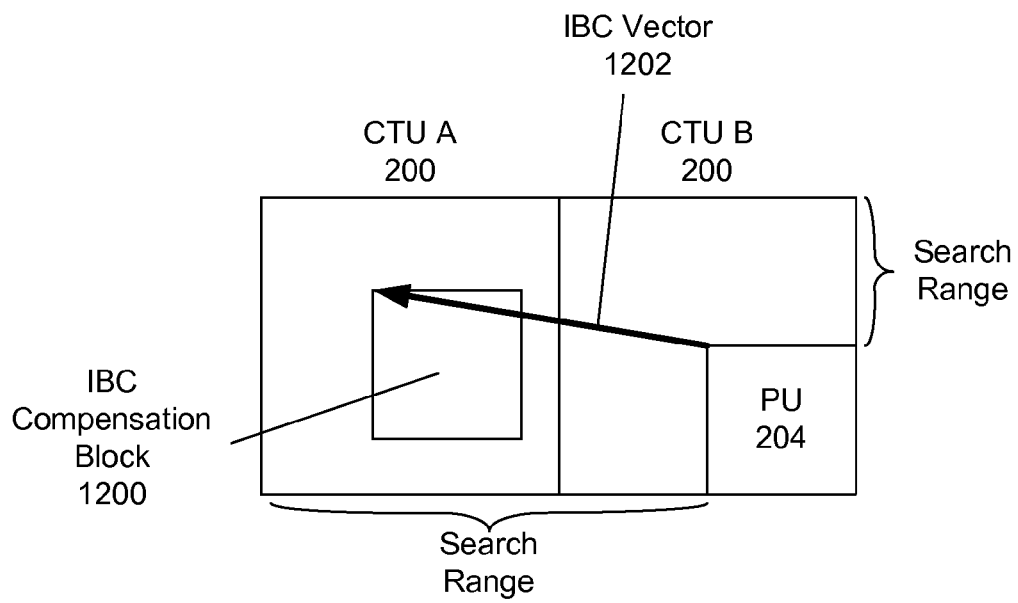
FIG. 12 depicts an example of intra block copy, in which a predicted PU is found in already coded areas of the same slice.

When a PU 204 is coded with intra block copy, an IBC compensation block 1200 can be found within the same slice 206 that is the same as, or similar to, the pixels of the current PU 204. By way of a non-limiting example, FIG. 12 depicts a search area for a particular PU 204 throughout portions of the same and other CTUs 200 that have already been coded within the same slice 206, and an IBC compensation block 1200 can be found within that search area. An IBC vector 1202 can be found that points from the top-left pixel of the PU 204 being coded to the top-left pixel of the IBC compensation block 1200. The IBC vector 1202 and the IBC compensation block 1200 can thus be similar to a motion vector 212 and a motion compensation block 214 that identify a predicted PU 208 when coding a PU 204 with inter prediction, except that the IBC vector 1202 points to an IBC compensation block 1200 within the same slice 206 as the current PU 204 instead of within a different slice 206. The IBC compensation block 1200 can act as a predicted PU 208 when coding the PU 204. The PU 204 can be coded with syntax elements in the HEVC bitstream 105 that describe the IBC vector 1202. A residual PU 210 that contains the differences between the current PU 204 and the IBC compensation block 1200/predicted PU 208 can also be coded in the HEVC bitstream 105.

FIG. 13 depicts a non-limiting set of set of syntax elements that can be coded with CUs 202, PUs 204, slices 206, and/or entire bitstreams 105. Syntax 1300 can convey information about the CUs 202, PUs 204, slices 206, and/or bitstream 105 that can be relevant to a coding system 110 and/or decoding system 140. By way of a non-limiting example, syntax 1300 output by a coding system 110 can indicate information about each CU 202 to a receiving decoding system 140, such that the decoding system 140 can follow the syntax 1300 to understand how the CU 202 was coded and thus how it can be decoded. Syntax 1300 can include, but is not limited to, a skip flag 1302, an intra block copy enabled flag 1304, an intra block copy flag 1306, and a prediction mode flag 1308. Further non-limiting examples of syntax elements that can be coded are shown in the exemplary code shown in FIGS. 15A-15B and FIGS. 17A-17B.

A skip flag 1302 can be added to a CU's syntax 1300 such that a decoding system 140 can later look at the skip flag 1302 to determine whether or not the CU 202 was coded in skip mode. In skip mode, the PUs 204 of a CU 202 can be coded by coding their predicted PUs 208 without coding residual PUs 210. By way of a non-limiting example, if the predicted PU 208 is identical to the PU 204 being coded, then subtracting them would lead to an empty residual PU 210 and so coding a residual PU 210 can be bypassed in skip mode. In some embodiments the skip flag 1302 can be set to "0" to indicate that the CU 202 was not coded in skip mode, or to "1" to indicate that the CU 202 was coded in skip mode, however in other embodiments different values can be used. In some embodiments, if the skip flag 1302 is not present in a CU's syntax 1300, its absence can indicate that the CU 202 was not coded in skip mode. In some embodiments, the skip flag 1302 can be referred to as "cu_skip_flag."

An intra block copy enabled flag (IBC enabled flag) 1304 can indicate whether or not a coding system 110 has been set to use intra block copy when coding CUs 202. In some embodiments the IBC enabled flag 1304 can be set to "0" to indicate that the coding system 110 was not set to use intra block copy, or to "1" to indicate that the that the coding system 110 was set to use intra block copy, however in other embodiments different values can be used. In some embodiments, if the IBC enabled flag 1304 is not present in syntax 1300, its absence can indicate that the coding system 110 was not set to use intra block copy. In some embodiments, the IBC enabled flag 1304 can be referred to as "intra_block_copy_enabled_flag."

An intra block copy flag (IBC flag) 1306 can indicate whether or not a particular CU 202 was coded with intra block copy. In some embodiments the IBC flag 1306 can be set to "0" to indicate that the CU 202 was not coded with intra block copy, or to "1" to indicate that the CU 202 was coded with intra block copy, however in other embodiments different values can be used. In some embodiments, if the IBC flag 1306 is not present in a CU's syntax 1300, its absence can indicate that the CU 202 was not coded with intra block copy. In some embodiments, the IBC flag 1306 can be referred to as "intra_bc_flag."

A prediction mode flag 1308 can indicate whether intra prediction or inter prediction was used to code a CU 202. In some embodiments the prediction mode flag 1308 can be set to "0" to indicate that the CU 202 was coded with inter prediction, or to "1" to indicate that the CU 202 was coded with intra prediction, however in other embodiments different values can be used. In some embodiments, if the prediction mode flag 1308 is not present in a CU's syntax 1300 and the CU 202 was not coded in skip mode or with intra block copy, its absence can indicate that the CU 202 was coded with intra prediction. In some embodiments, the prediction mode flag 1308 can be referred to as "pred_mode_flag."

Returning to FIG. 12, in many situations intra block copy can result in increased compression overall when compared to using standard coding methods such as intra prediction and inter prediction. For example, when a PU 204 is coded with intra prediction, intra block copy often offers better compression because in many situations the IBC compensation block 1200 pointed to by an IBC vector 1202 is a very close match for a particular PU 204. Image slices 206 often have pixels with repeated areas or patterns within the same slice 206, and so an IBC compensation block 1200 in the same slice 206 is often a very close match for a PU 204 in that same slice 206, and is generally more detailed than a predicted PU 208 that was estimated through spatial prediction from immediately neighboring pixels. By way of a non-limiting example, an input image can display a scene with wallpaper in the background, and the details of the wallpaper's pattern can be essentially identical at multiple places throughout an image slice 206. When coding a PU 204 that shows a piece of that wallpaper pattern, pointing to an IBC compensation block 1200 that displays that same portion of the wallpaper pattern within the same slice 206 can often better capture the details of the pattern than using an estimate of the pattern predicted through spatial prediction as shown in FIG. 7.

However, when the PU 204 is coded with inter prediction, an IBC compensation block 1200 is often less of a match for the PU 204 than a predicted PU 208 found from a motion compensation block 214 in a different slice 206, as pointed to by a motion vector 212. Because inter prediction can have motion vectors 212 that point to motion compensation blocks 214 in previous or subsequent slices 206, even slices 206 in different images, the motion compensation block 214 in a different slice is very often a much closer match for the PU 204 than an IBC compensation block 1200 in the same slice. By way of a non-limiting example, if a particular PU 204 has pixels displaying a corner of a stop sign, and the previous frame in a video sequence shows that same stop sign at a slightly different position in the frame, coding the PU 204 with a motion vector 212 that points to a motion compensation block 214 in the previous frame that displays the same corner of the stop sign would likely better capture the details of the current PU 204 than pointing to another area within the same slice 206, because other areas of the slice 206 would likely either not show the stop sign all, or would show different sections of the stop sign. As such, regular temporal motion compensation with inter prediction often provides equal or better prediction of a PU 204 when compared to intra block copy.

Figure 14:
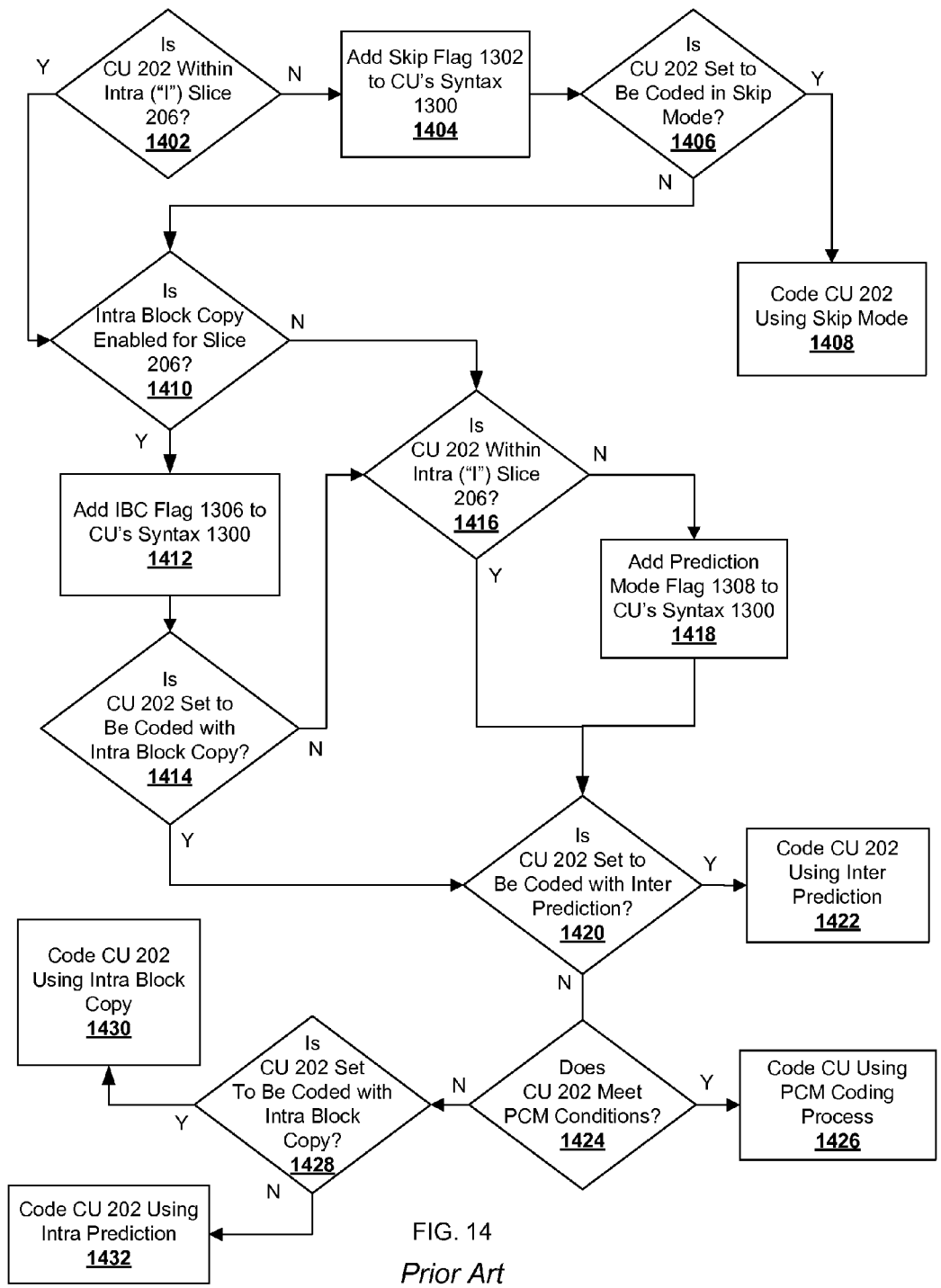
FIG. 14 depicts a previous method of coding a CU and adding syntax, in which an intra block copy flags are added to CUs in both intra slices and inter slices.

Despite this, prior methods of coding CUs 202 allow intra block copy to be used or considered CUs 202 in both inter slices 206 and intra slices 206. By way of non-limiting examples, FIG. 14 depicts a prior method of coding a CU 202 and adding syntax 1300, and FIGS. 15A and 15B depict non-limiting exemplary code for an existing method of coding and adding syntax 1300 for a CU 202. As can be seen, in these embodiments, if the intra block copy enabled flag 1304 indicates that intra block copy has been enabled for use by the coding system 110, each and every CU 202 can be given an intra block copy flag 1306. Adding an intra block copy flag 1306 to every CU 202, including CUs 202 within inter slices 206, can waste time and processor cycles and can add unnecessary bits to the bitstream 105.

At step 1402, the coding system 110 can determine whether the CU 202 is within an intra slice 206 ("I" slice) or an inter slice 206 ("B" or "P" slice). If the CU 202 is within an inter slice 206, the coding system 110 can move to step 1404. If the CU 202 is within an intra slice 206, the coding system 110 can move directly to step 1410.

At step 1404, after the coding system 110 has determined during step 1402 that the CU 202 is within an inter slice 206, the coding system 110 can add a skip flag 1302 to the CU's syntax 1300. As described above, the skip flag 1302 can indicate whether or not the CU 202 is to be coded with skip mode.

At step 1406, the coding system 110 can move to step 1408 if the CU 202 is set to be coded in skip mode, and the CU 202 can then be coded in skip mode at step 1408 by coding its predicted PUs 208 without coding a residual PU 210. However, if the CU 202 is not set to be coded in skip mode the coding system 110 can move from step 1406 to step 1410.

At step 1410, after the coding system 110 has either determined that the CU 202 was within an intra slice 206, or that it was within an inter slice 206 but was not set to be coded in skip mode, the coding system 110 can determine whether intra block copy has been enabled. An IBC enabled flag 1304 in a sequence parameter set (SPS) can indicate whether the coding system 110 is set to use intra block copy when coding CUs 202. If the IBC enabled flag 1304 indicates that intra block copy is not set to be used, the coding system 110 can move directly to step 1416.

However, if the IBC enabled flag 1304 indicates during step 1410 that intra block copy is set to be used, the coding system 110 can add an IBC flag 1306 to the CU's syntax 1300 at step 1412. In this embodiment, CUs 202 in both intra slices 206 and inter slices 206 can be given an IBC flag 1306 when the IBC enabled flag 1304 indicates that intra block copy has been enabled. The IBC flag 1306 added during step 1412 can indicate whether or not the CU 202 is to be coded using intra block copy.

At step 1414, the coding system 110 can choose to move directly to step 1420 if the CU 202 is set to be coded with intra block copy, or to step 1416 if the CU 202 is not set to be coded with intra block copy.

At step 1416, after the coding system 110 has determined either from the IBC enabled flag 1304 that intra block copy was not enabled, or that intra block copy was enabled but that this particular CU 202 was not set to be coded with intra block copy, the coding system 110 can look at whether the CU 202 is within an intra slice 206 or an inter slice 206 to determine whether the CU 202 should be coded with inter prediction or inter prediction.

If the CU 202 is found to within an inter slice 206 during step 1416, at step 1418 the coding system 110 can set the CU 202 to be coded either using intra prediction or inter prediction and add a prediction mode flag 1308 to the CU's syntax 1300 indicating which prediction mode is to be used. The coding system 110 can then move to step 1420.

If the CU 202 was found to be within an intra slice 206 during step 1416, the coding system 110 can move directly to step 1420. In some embodiments, the coding system 110 can omit a prediction mode flag 1308 from the CU's syntax 1300 in this situation, and its absence can indicate to a decoding system 140 that the CU 202 was coded with intra prediction. In other embodiments, the coding system 110 can add a prediction mode flag 1308 set to a value that can indicate to a decoding system 140 that the CU 202 was coded using intra prediction.

At step 1420, the coding system 110 can determine whether the CU 202 is set to be coded using inter prediction. By way of a non-limiting example, it can look at the prediction mode flag 1308. If the CU 202 is set to be coded using intra prediction, the coding system 110 can move directly to step 1422 and code the CU 202 or its PUs 204 using inter prediction as described above with respect to FIG. 8 and FIG. 9.

However, if during step 1420 the coding system 110 finds that the CU 202 was not set to be coded using inter prediction, the coding system 110 can move to step 1424 and determine whether conditions are met that indicate that the CU 202 should be coded in pulse-code modulation (PCM)

mode. In PCM mode, a CU 202 can be coded directly without the prediction, transforming, or entropy coding steps discussed above with respect to FIG. 9. One of the PCM conditions can be that the CU 202 is not set to be coded using intra block copy. If the CU 202 does not meet the PCM conditions, such as if it is set to be coded using intra block copy, or if it is not set to be coded using intra block copy but does not meet the other PCM conditions, the coding system 110 can move directly to step 1428. However, if the CU 202 is not set to be coded using intra block copy and also meets the other PCM conditions, the coding system 110 can move to step 1426 to code the CU 202 in PCM mode.

At step 1428, after the coding system 110 has determined that the CU 202 was not to be coded in PCM mode, the coding system 110 can determine whether the CU 202 is set to be coded using intra block copy. By way of a non-limiting example, it can look at whether an IBC flag 1306 exists, and if so what its value is. If the CU 202 is set to be coded using intra block copy, the coding system 110 can move to step 1430 and code the CU 202 or its PUs 204 using intra block copy as described above with respect to FIG. 12. If the CU 202 is not set to be coded using intra block copy, the coding system 110 can move to step 1432 and code the CU 202 or its PUs 204 using intra prediction as described above with respect to FIG. 7 and FIG. 9.

In previous methods of coding CUs 202, such as those shown in FIGS. 14 and 15A-15B, intra block copy could be enabled for both intra slices 206 and inter slices 206, and CUs 202 in both types of slices 206 could be given IBC flags 1306. As discussed above, CUs 202 within inter slices 206 can be coded using inter prediction or intra prediction, and the temporal prediction offered by inter prediction is often superior to intra block copy, as a motion vector 212 pointing to a motion compensation block 214 in a different slice 206 is very often a better match for a CU 202 or PU 204 than an IBC compensation block 1200 in the same slice 206.

Because intra block copy is often irrelevant to CUs 202 within inter slices 206, having a coding system 110 follow steps related to intra block copy (such as steps 1410, 1412, and 1414) for CUs 202 within inter slices 206 can waste time and/or processor cycles. By way of a non-limiting example, in the embodiment shown in FIG. 14, a coding system 110 processing a CU 202 within an inter slice 206 when intra block copy has been enabled can go through step 1402, move to step 1404 and add a skip flag 1302 that indicates the CU 202 is not to be coded in skip mode, then at step 1406 be directed to step 1410. Because intra block copy has been enabled, the coding system 110 can be directed to step 1412, where it can add an IBC Flag 1306 to the CU's syntax 1300 indicating that intra block copy should not be used to code the CU 202. Then, at step 1414 the coding system can finally reach step 1416, after which it can decide whether to code the CU 202 using intra prediction, inter prediction, or PCM mode. In addition, because the information indicated by an IBC Flag 1306 is generally irrelevant for CUs 202 within inter slices 206, having the coding system 110 add an IBC Flag 1306 to CUs 202 within inter slices 206 adds an extraneous bit for each CU 202 within inter slices 206.

As another non-limiting example, the code shown in FIGS. 15A-15B at the lines indicated by numeral 1500 adds "intra_bc_flag" to a CU's syntax 1300 if intra block copy has been enabled, regardless of whether the CU 202 is in an inter slice 206 or an intra slice 206, as long as the CU 202 was not coded in skip mode. Because adding this IBC flag 1306 can be generally irrelevant for CUs 202 within inter slices, as regular temporal prediction is often equal or better to intra block copy, it can waste time and/or processor cycles to check whether intra block copy is enabled and add an IBC flag 1306 for CUs 202 both types of slices 206. Adding IBC flags 1306 for each and every CU 202 can also add extraneous bits to the bitstream 105, as each IBC flag 1306 takes up one bit and the IBC flags 1306 are generally irrelevant to CUs 202 within inter slices 206.

It can similarly waste time and/or processor cycles for a decoding system 140 to search for IBC flags 1306 for CUs 202 within inter slices 206, because intra block copy is often irrelevant for CUs 202 within inter slices 206.

Figure 16:
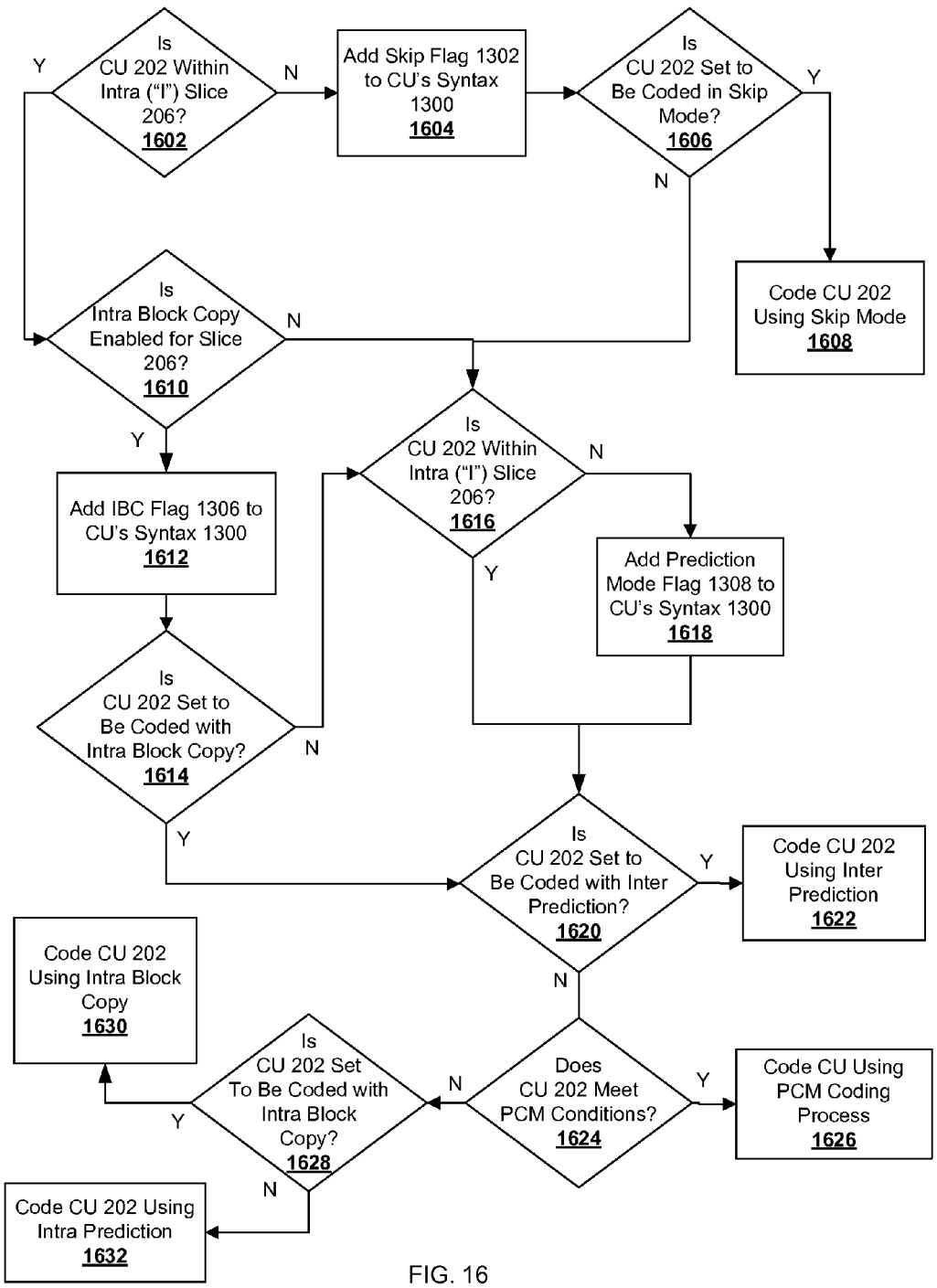
FIG. 16 depicts an exemplary method of coding a CU and adding syntax, in which intra block copy flags are added only to CUs within intra slices and intra block copy is disabled when coding CUs within inter slices.
Figure 18:
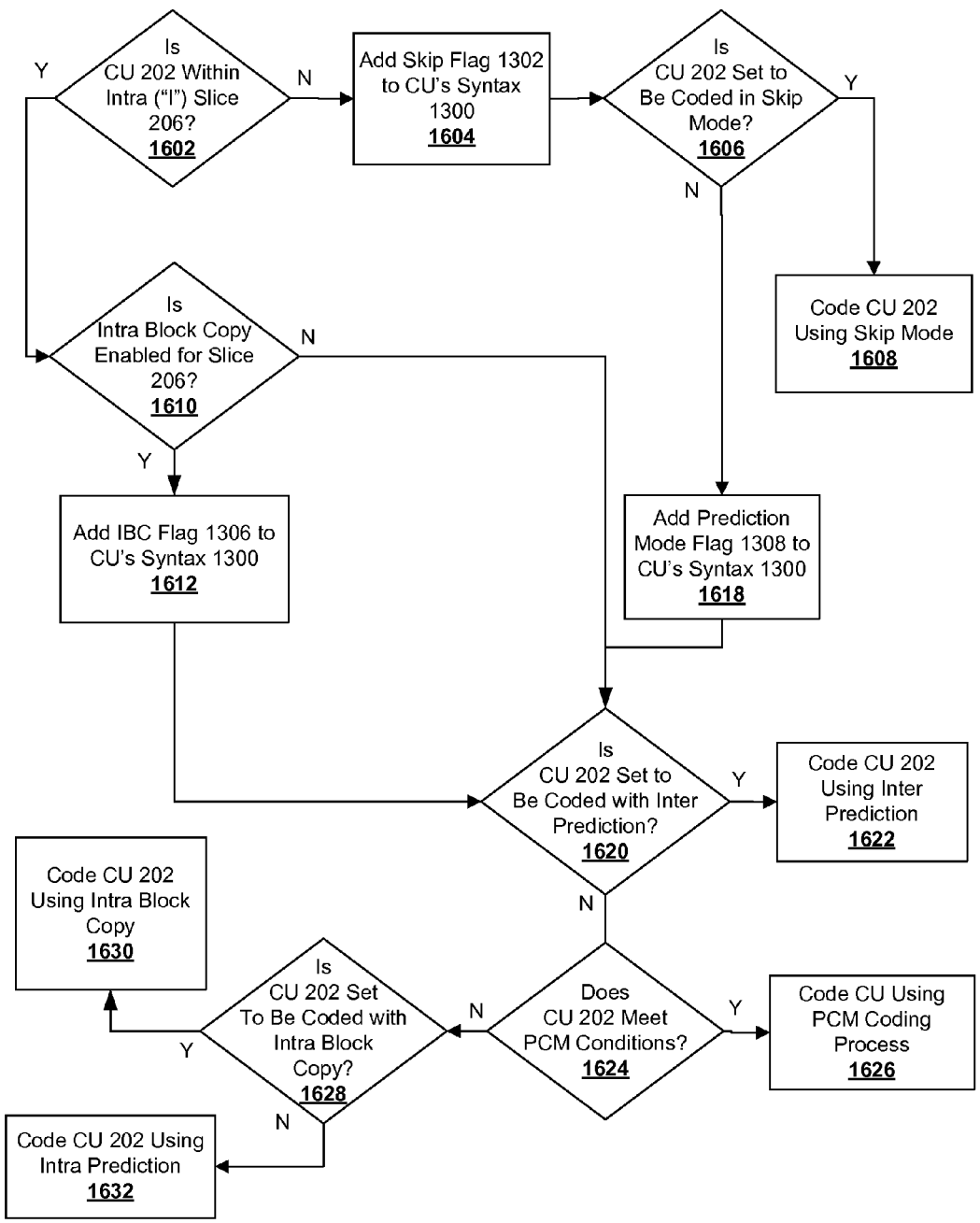
FIG. 18 depicts an alternate embodiment of FIG. 16, in which certain steps are bypassed.

FIG. 16 depicts an exemplary process for coding and providing syntax 1300 for CUs 202, in which a coding system 110 only follows steps related to intra block copy and add an IBC flag 1306 when a CU 202 is within an intra slice 206, and does not follow those steps or add IBC flags 1306 for CUs 202 within inter slices 206. By not adding IBC flags 1306 for CUs 202 within inter slices 206, each of which would take up one bit, the size of the bitstream 105 can be decreased. FIGS. 17A-17B depict non-limiting, exemplary code for a method of coding and adding syntax 1300 for a CU 202, in which steps related to intra block copy and adding IBC flags 1306 are followed only when a CU 202 is within an intra slice 206 and not when a CU 202 is within an inter slice 206. FIG. 18 depicts an alternate embodiment of FIG. 16, in which certain steps can be bypassed.

At step 1602, the coding system 110 can determine whether the CU 202 is within an intra slice 206 ("I" slice) or an inter slice 206 ("B" or "P" slice). If the CU 202 is within an inter slice 206, the coding system 110 can move to step 1604. If the CU 202 is within an intra slice 206, the coding system 110 can move to step 1610.

At step 1604, after the coding system 110 has determined during step 1602 that the CU 202 is within an inter slice 206, the coding system 110 can add a skip flag 1302 to the CU's syntax 1300. As described above, the skip flag 1302 can indicate whether or not the CU 202 is to be coded with skip mode.

At step 1606, the coding system 110 can move to step 1608 if the CU 202 is set to be coded in skip mode, and the CU 202 can then be coded in skip mode at step 1608 by coding its predicted PUs 208 without coding a residual PU 210.

However, if the CU 202 is not set to be coded in skip mode, in some embodiments the coding system 110 can move directly from step 1606 to step 1616 and bypass steps related to intra block copy such as steps 1610, 1612, and/or 1614. In alternate embodiments, the coding system 110 can move directly to step 1618 from step 1606 as shown in FIG. 18 after determining that the CU 202 is not set to be coded in skip mode, because the coding system 110 already determined during step 1602 that the CU 202 is within an inter slice 206, and so duplication of that determination during step 1616 can be bypassed.

Returning to step 1602, if the coding system 110 determined that the CU 202 was within an intra slice 206, the coding system 110 can move to step 1610 to determine whether intra block copy has been enabled. An IBC enabled flag 1304 in a sequence parameter set (SPS) can indicate whether the coding system 110 is set to use intra block copy when coding CUs 202. In some embodiments, if the IBC enabled flag 1304 indicates that intra block copy is not set to be used, the coding system 110 can move directly to step 1616. In alternate embodiments, the coding system 110 can move directly to step 1620 from step 1610 as shown in FIG. 18 after determining that intra block copy has not been enabled, because the coding system 110 already determined during step 1602 that the CU 202 is within an intra slice 206, and so duplication of that determination during step 1616 can be bypassed.

However, if the IBC enabled flag 1304 indicates during step 1610 that intra block copy is set to be used, the coding system 110 can add an IBC flag 1306 to the CU's syntax 1300 at step 1612. In this embodiment, only CUs 202 in intra slices 206 can be given an IBC flag 1306 when the IBC enabled flag 1304 indicates that intra block copy has been enabled, as CUs 202 in inter slices 206 are not directed through steps 1610 and 1612. For CUs 202 in intra slices 206, the IBC flag 1306 added during step 1612 can indicate whether or not the CU 202 is to be coded using intra block copy.

In some embodiments, at step 1614 the coding system 110 can move directly to step 1620 if the CU 202 is set to be coded with intra block copy, or to step 1616 if the CU 202 is not set to be coded with intra block copy. In alternate embodiments, after the IBC Flag 1306 has been added to the CU's syntax 1300 during step 1612, the coding system 110 can move directly to step 1620, as shown in FIG. 18, because the coding system 110 already determined during step 1602 that that the CU 202 is within an intra slice 206, and so determining during step 1614 whether to move to step 1616 in order to check whether the CU 202 is within an intra slice 206 can be bypassed.

At step 1616, after the coding system 110 has determined that the CU 202 has not been set to be coded with intra block copy, the coding system 110 can look at whether the CU 202 is within an intra slice 206 or an inter slice 206 to determine whether the CU 202 should be coded with intra prediction or inter prediction. As discussed above, the coding system 110 can have reached step 1616 after finding that the CU 202 was within an inter slice 206 (and thus that the CU 202 is not set to be coded with intra block copy because intra block copy is not used for inter slices 206 in this embodiment), that the CU 202 was within an intra slice 206 but intra block copy was not enabled, or that intra block copy was enabled for the intra slice 206 but this particular CU 202 was not set to be coded with intra block copy. As mentioned above, in alternate embodiments such as that shown in FIG. 18, step 1616 can be bypassed because the coding system 110 already determined during step 1602 whether the CU 202 was within an inter slice 206 or an intra slice 206.

If the CU 202 was found to within an inter slice 206 during step 1616, at step 1618 the coding system 110 can set the CU 202 to be coded either using intra prediction or inter prediction and add a prediction mode flag 1308 to the CU's syntax 1300 indicating which prediction mode is to be used. In alternate embodiments, the coding system 110 can reach step 1618 directly after step 1606 because the coding system 110 already determined during step 1602 that the CU 202 was within an inter slice 206. The coding system 110 can then move to step 1620.

If the CU 202 was found to be within an intra slice 206 during step 1616, the coding system 110 can move directly to step 1620. In some embodiments, the coding system 110 can omit a prediction mode flag 1308 from the CU's syntax 1300 in this situation, and its absence can indicate to a decoding system 140 that the CU 202 was coded with intra prediction. In other embodiments, the coding system 110 can add a prediction mode flag 1308 set to a value that can indicate to a decoding system 140 that the CU 202 was coded using intra prediction.

At step 1620, the coding system 110 can determine whether the CU 202 is set to be coded using inter prediction. By way of a non-limiting example, it can look at the prediction mode flag 1308. If the CU 202 is set to be coded using inter prediction, the coding system 110 can move directly to step 1622 and code the CU 202 or its PUs 204 using inter prediction as described above with respect to FIG. 8 and FIG. 9.

However, if during step 1620 the coding system 110 finds that the CU 202 was not set to be coded using inter prediction, the coding system 110 can move to step 1624 and determine whether conditions are met that indicate that the CU 202 should be coded in pulse-code modulation (PCM) mode. As described above, in PCM mode a CU 202 can be coded directly without the prediction, transforming, or entropy coding steps discussed above with respect to FIG. 9. One of the PCM conditions can be that the CU 202 is not set to be coded using intra block copy. If the CU 202 does not meet the PCM conditions, such as if it is set to be coded using intra block copy, or if it is not set to be coded using intra block copy but does not meet the other PCM conditions, the coding system 110 can move directly to step 1628. However, if the CU 202 is not set to be coded using intra block copy and also meets the other PCM conditions, the coding system 110 can move to step 1626 to code the CU 202 in PCM mode.

At step 1628, after the coding system 110 has determined that the CU 202 was not to be coded in PCM mode, the coding system 110 can determine whether the CU 202 is set to be coded using intra block copy. By way of a non-limiting example, it can look at whether an IBC flag 1306 exists, and if so what its value is. If the CU 202 is set to be coded using intra block copy, the coding system 110 can move to step 1630 and code the CU 202 or its PUs 204 using intra block copy as described above with respect to FIG. 12. If the CU 202 is not set to be coded using intra block copy, the coding system 110 can move to step 1632 and code the CU 202 or its PUs 204 using intra prediction as described above with respect to FIG. 7 and FIG. 9.

As explained above, intra block copy is generally irrelevant to CUs 202 within inter slices, and in the embodiments of FIGS. 16, 17A-17B, and 18 steps related to intra block copy are only followed if the CU 202 is within an intra slice 206. By way of a non-limiting example, when coding a CU 202 in an intra slice, a coding system 110 can be directed from step 1602 directly to step 1610 where steps 1612 and 1614 can be followed if intra block copy is enabled. However if the CU 202 is within an inter slice, the coding system 110 can bypass steps 1610, 1612, and 1614 completely such that no check for whether intra block copy is enabled is performed, no IBC flag 1306 is added to the CU's syntax 1300, and no check for whether the CU 202 itself is set to be coded with intra block copy is performed. These bypasses can improve efficiency of the coding system 110 and reduce wasted processor cycles. It can also reduce the size of the bitstream 105, as bits that would otherwise have been allocated to the IBC Flags 1306 of CUs 202 within inter slices 206 can be omitted.

As another non-limiting example, the code shown in FIGS. 17A-17B at the lines indicated by numeral 1700 either determines that the CU 202 is within an inter slice 206 (such that the slice type "slice_type" is not "I") and adds a skip flag 1302, or else it determines that the CU 202 is within an intra slice (such that the slice type "slice_type" is "I") and adds an IBC flag 1306 "intra_bc_flag" if intra block copy has been enabled. As such, intra block copy is disabled for CUs 202 within inter slices 206 and no IBC flags 1306 are added to their syntax 1300, but it can be enabled for CUs 202 within intra slices 206 such that IBC flags 1306 can be added to their syntax 1300.

Similarly, a decoding system 140 can know that a coding system 110 following the methods of FIG. 16, 17A-17B, or 18 will not have added IBC flags 1306 to syntax 1300 of CUs 202 within inter slices 206. Therefore, decoding systems 140 can improve efficiency and reduce wasted processor cycles by not checking for IBC flags 1306 when decoding CUs 202 within inter slices 206.

Figure 19:
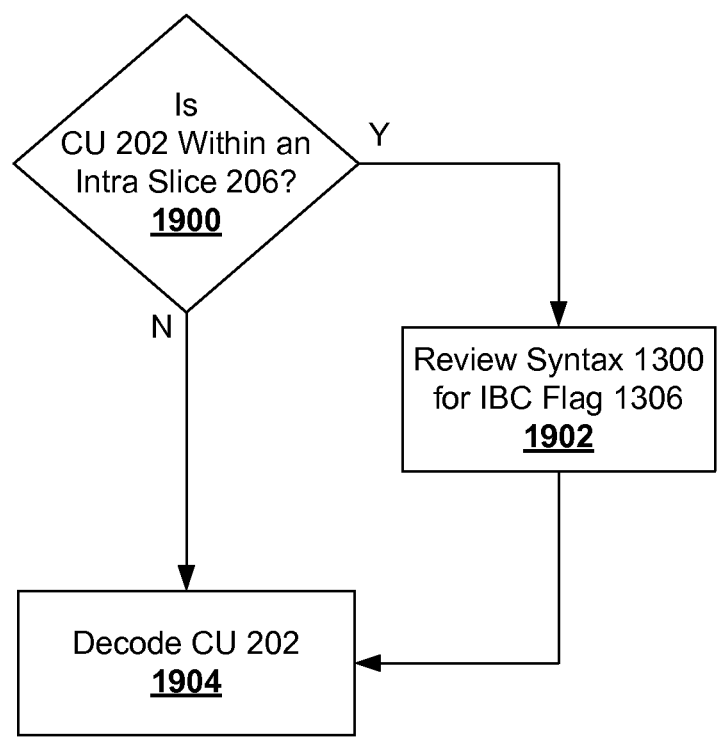
FIG. 19 depicts an exemplary process for a decoding system reviewing syntax.

By way of a non-limiting example, FIG. 19 depicts an exemplary process for a decoding system 140. At step 1900, the decoding system 140 can determine whether a CU 202 is within an intra slice or an inter slice. If the CU 202 is within an intra slice, the decoding system 140 can review the CU's syntax 1300 for an IBC flag 1306, and can then move to step 1904 to begin decoding the CU 202. If the IBC flag 1306 indicated that the CU 202 was encoded with intra block copy, then the decoding system 140 can use the IBC vector 1202 to find the IBC compensation block 1200 in the same slice 206 and reconstruct the CU 202. Or, if the IBC flag 1306 indicated that the CU 202 was not encoded with intra block copy, the decoding system 140 can decode the CU 202 appropriately using other syntax to determine what encoding method was used. However, if the decoding system 140 determines at step 1900 that the CU 202 is within an inter slice 206, the decoding system 140 can bypass step 1902 and move straight to decoding the CU 202. As intra block copy is disabled for CUs 202 within inter slices 206 in this embodiment, the decoding system 140 can avoid checking CUs 202 within inter slices 206 for an IBC flag 1306.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A method for decoding high efficiency video coding, comprising:
   determining whether a coding unit is within an intra slice or an inter slice;
   determining whether intra block copy has been enabled;
   reviewing syntax for said coding unit for an intra block copy flag when said coding unit is within an intra slice and intra block copy has been enabled; and
   omitting reviewing said syntax for said intra block copy flag when said coding unit is within an inter slice.

2. The method of claim 1, wherein said intra block copy flag either contains a first value indicating that said coding unit was coded with intra block copy or a second value indicating that said coding unit was not coded with intra block copy.

3. The method of claim 2, further comprising decoding said coding unit with intra block copy decoding when said intra block copy flag contains said first value.

4. The method of claim 2, further comprising decoding said coding unit with either intra prediction or inter prediction when said intra block copy flag contains said second value.

5. The method of claim 1, further comprising decoding said coding unit with intra prediction when said coding unit is within an intra slice and said intra block copy flag does not indicate that said coding unit was coded with intra block copy.

6. The method of claim 1, further comprising decoding said coding unit with either intra prediction or inter prediction when said coding unit is within an inter slice.

7. A method for high efficiency video coding, comprising:
   determining whether a coding unit is within an intra slice or an inter slice;
   determining whether intra block copy has been enabled;
   adding an intra block copy flag to said coding unit's syntax when said coding unit is within an intra slice and intra block copy has been enabled; and
   omitting said intra block copy flag from said coding unit's syntax when said coding unit is within an inter slice.

8. The method of claim 7, wherein said intra block copy flag either contains a first value indicating that said coding unit is to be coded with intra block copy or a second value indicating that said coding unit is not to be coded with intra block copy.

9. The method of claim 8, further comprising coding said coding unit with intra block copy when said intra block copy flag contains said first value.

10. The method of claim 8, further comprising coding said coding unit with either intra prediction or inter prediction when said intra block copy flag contains said second value.

11. The method of claim 7, further comprising coding said coding unit with intra prediction when said coding unit is within an intra slice and said intra block copy flag does not indicate that said coding unit is to be coded with intra block copy.

12. The method of claim 7, further comprising coding said coding unit with either intra prediction or inter prediction when said coding unit is within an inter slice.

13. The method of claim 7, wherein omitting said intra block copy flag from said coding unit's syntax when said coding unit is within an inter slice reduces a bitstream's size by one bit.

14. A decoding system for high efficiency video coding, comprising:
   a decoder configured to:
   determine whether a coding unit is within an intra slice or an inter slice;
   determine whether intra block copy has been enabled;
   review syntax for said coding unit for an intra block copy flag when said coding unit is within an intra slice and intra block copy has been enabled; and
   omit reviewing said syntax for said intra block copy flag when said coding unit is within an inter slice.

15. The decoding system of claim 14, wherein said intra block copy flag either contains a first value indicating that said coding unit was coded with intra block copy or a second value indicating that said coding unit was not coded with intra block copy.

16. The decoding system of claim 15, wherein said decoder is further configured to decode said coding unit with intra block copy decoding when said intra block copy flag contains said first value.

17. The decoding system of claim 15, wherein said decoder is further configured to decode said coding unit with either intra prediction or inter prediction when said intra block copy flag contains said second value.

18. The decoding system of claim 14, wherein said decoder is further configured to decode said coding unit with intra prediction when said coding unit is within an intra slice and said intra block copy flag does not indicate that said coding unit was coded with intra block copy.

19. The decoding system of claim 14, wherein said decoder is further configured to decode said coding unit with either intra prediction or inter prediction when said coding unit is within an inter slice.

* * * * *